(12) United States Patent
Domanico

(10) Patent No.: US 6,755,639 B2
(45) Date of Patent: Jun. 29, 2004

(54) APPARATUS AND METHOD FOR FORMING A BATHTUB LINER

(76) Inventor: Mark Wayne Domanico, 2263 Kaskaskia Ct., Naperville, IL (US) 60156

( * ) Notice: Subject to any disclaimer, the term of this patent is extended or adjusted under 35 U.S.C. 154(b) by 0 days.

(21) Appl. No.: 09/844,504

(22) Filed: Apr. 27, 2001

(65) Prior Publication Data

US 2002/0157763 A1 Oct. 31, 2002

(51) Int. Cl.[7] .......................... B29C 51/10; B29C 51/36
(52) U.S. Cl. ................. 425/384; 425/388; 425/DIG. 47
(58) Field of Search ................. 425/11, DIG. 48, 425/387.1, 384, 388, 394; 4/580

(56) References Cited

U.S. PATENT DOCUMENTS

| | | | | |
|---|---|---|---|---|
| 3,654,012 A | * | 4/1972 | Schlager | ..................... 156/212 |
| 3,933,562 A | * | 1/1976 | Cruckshank et al. | ...... 425/387.1 |
| 4,363,617 A | * | 12/1982 | Hirsekorn | ................... 425/388 |
| 4,555,381 A | * | 11/1985 | Chazal et al. | ............... 264/516 |
| 4,750,967 A | * | 6/1988 | Kott et al. | .................. 425/388 |
| 5,217,563 A | * | 6/1993 | Niebling et al. | ......... 425/405.1 |

* cited by examiner

*Primary Examiner*—Robert Davis
*Assistant Examiner*—Thu Khanh T. Nguyen
(74) *Attorney, Agent, or Firm*—Factor & Lake

(57) ABSTRACT

An apparatus for forming a bathtub liner over an existing bathtub comprising a container, a seal, a heating element, and a pressure increasing element. The container defines a cavity. The seal is associated with cavity and is capable of forming a substantially continuous seal with a bathtub liner. The heating element is capable of heating the cavity, and in turn, the liner. The pressure increasing element is capable of increasing the pressure within the cavity, to in turn, force a bathtub liner outwardly, away from the cavity. Upon positioning of the liner and apparatus over an existing bathtub the pressure increasing element will force the liner toward and into contact with the surfaces of the existing bathtub.

11 Claims, 3 Drawing Sheets

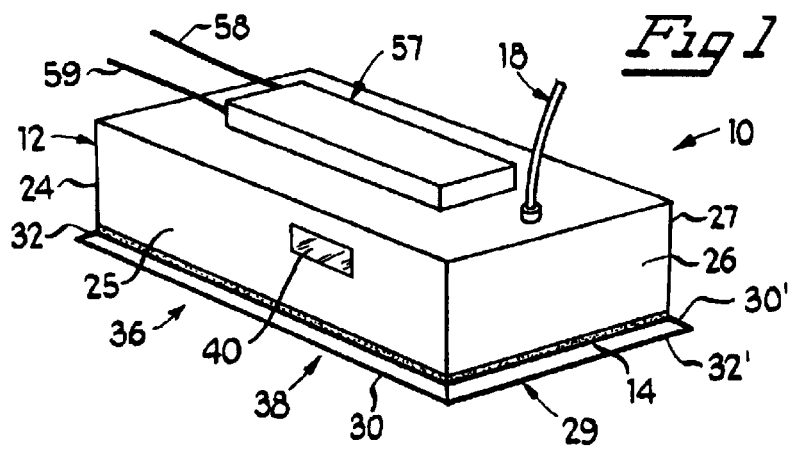
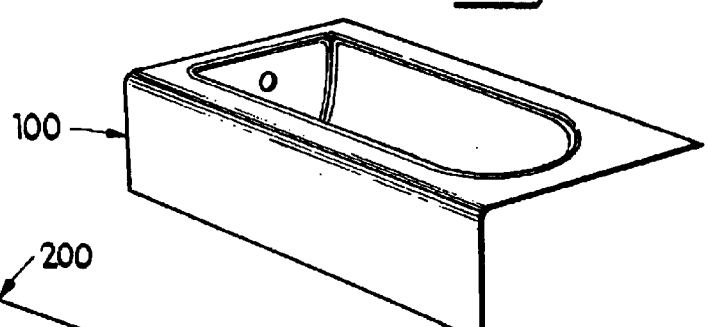
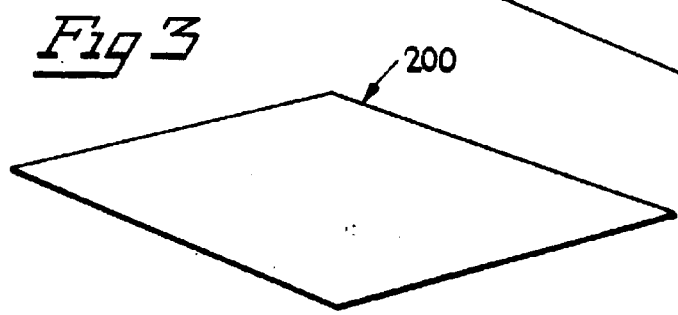
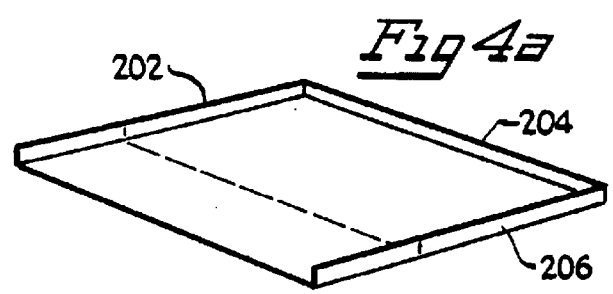
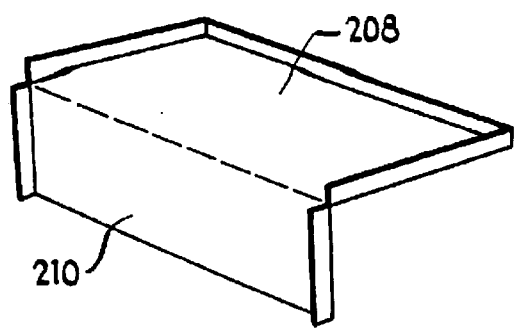

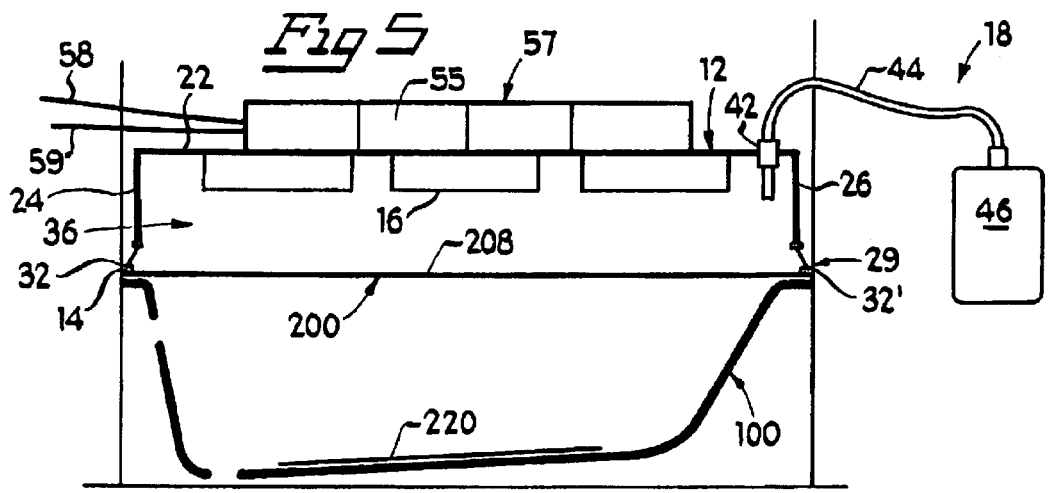
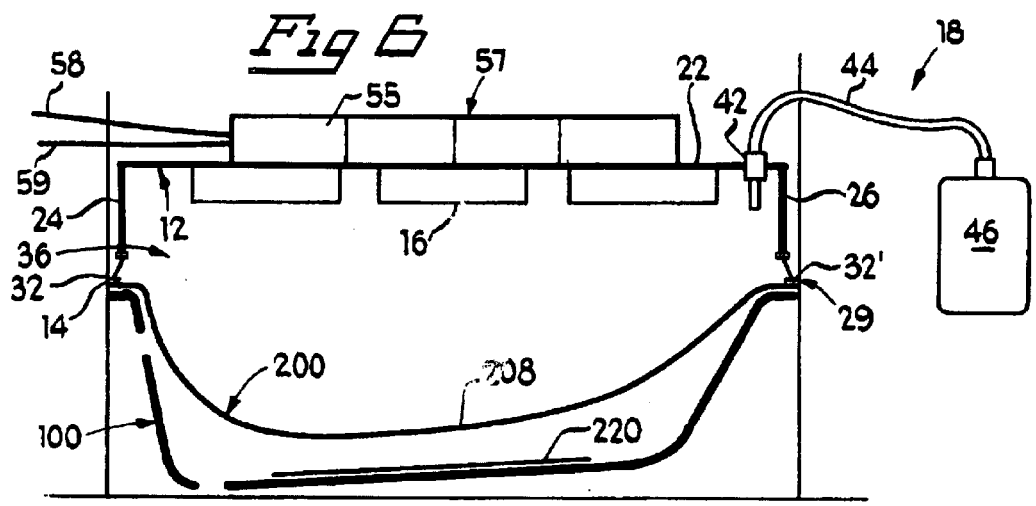
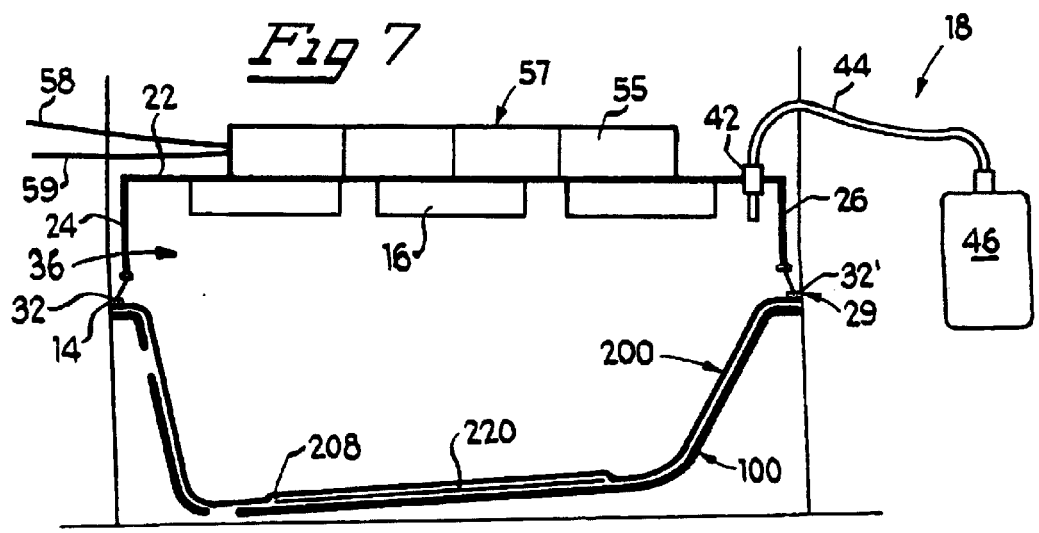

APPARATUS AND METHOD FOR FORMING A BATHTUB LINER

BACKGROUND OF THE INVENTION

1. Field of the Invention

The present invention relates in general to bathtubs, and more particularly, to a bathtub and shower stall liner which can be formed off site at, for example a manufacturing facility, as well as on site without removal of the existing bathtub. It will be understood that while the application will discuss embodiments pertaining to bathtubs, such principles are equally applicable to shower stall liners and other fluid holding members (i.e. a tank or the like).

2. Background Art

Bathtub replacement and/or remodeling has long been known in the art. Due to the costs involved with the replacement of bathtubs, alternatives have been developed. Included in these alternatives is the use of a liner (or cover) which is molded to fit over an existing bathtub thereby eliminating the cost of removing the existing bathtub.

While the use of bathtub liners has provided an attractive alternative to bathtub replacement, there are nevertheless drawbacks. For example, among other problems, due to the differences in bathtub dimensions and designs, one must maintain an inventory of differently dimensioned molds so that a suitable mold exists for each of a variety of bathtubs. Even with a variety of molds, it is often difficult to perfectly match the existing bathtub. In turn, even with a substantial (and costly) inventory of molds, obtaining a good fitting liner can be difficult.

Thus, it is an object of the invention to provide an apparatus which facilitates the in place molding of a bathtub liner.

It is another object of the invention to provide a method of molding of a bathtub liner.

These and other objectives will become apparent in light of the specification and claims appended hereto.

SUMMARY OF THE INVENTION

The invention comprises an apparatus for forming a bathtub liner over an existing bathtub. The apparatus comprises a container, a seal, a heating element and a pressure increasing means. The container defines a cavity. The seal is associated with cavity and is capable of forming a substantially continuous seal with a bathtub liner. The heating element is capable of heating the cavity. The pressure increasing means is capable of increasing pressure within the cavity, to in turn, force a bathtub liner outwardly, away from the cavity. Upon positioning of the liner and apparatus over a existing bathtub, the pressure increasing means will force the liner toward and into eventual partial contact with the surfaces of the existing bathtub.

In a preferred embodiment, the container further comprises a top surface and a plurality of side walls associated with the top surface.

In another embodiment, the container further comprises a compensating. Preferably, the length compensating member includes a width compensating member and a length compensating member. The compensating member may comprise a kit of compensating members which renders the apparatus capable of adjusting to correspond to a bathtub which is between 4 and 6 feet longbetween 30 and 36 inches wide.

In another embodiment, at least a portion of the container comprises a substantially transparent member.

In one embodiment, the plurality side walls define a lower perimeter, the seal member extending about the perimeter defined by the plurality of side walls.

In another embodiment, the heating element comprises a heater member positioned within the cavity. Preferably, the heating element comprises an electric heater being selectively activated.

In one embodiment, the pressure increasing means comprises at least one air compressor in fluid communication with the cavity of the container.

In another embodiment, the apparatus further comprises a weight associated with the container, to, in turn, enhance the effectiveness of the seal. Preferably, the weight comprises a container having at least one of an inlet and an outlet, the container being capable of storing a predetermined quantity of fluid therein.

The invention likewise comprises a method of forming a bathtub liner. The method includes the steps of providing a suitably sized liner for an existing bathtub, positioning a liner over the existing bathtub, positioning a bathtub forming apparatus over the liner, the apparatus having a cavity, heating the liner to a sufficient temperature to permit deformation; pressurizing the cavity formed by the liner and the bathtub forming apparatus, and, deforming the liner.

In a preferred embodiment, the step of providing a liner comprises the steps of measuring the existing bathtub and sizing the liner to the measurements of the existing bathtub.

Preferably, the method further comprises the step of forming a skirt member prior to the step of positioning the liner over the existing bathtub.

In a preferred embodiment, the step of positioning the bathtub liner apparatus comprises at least one of the steps of adjusting the length of the bathtub liner apparatus and adjusting the width of the bathtub liner apparatus.

In one embodiment, the step of heating comprises the steps of activating an electric heating member positioned within the cavity.

In a preferred embodiment, the step of pressurizing the cavity comprises the steps of providing an air compressor, placing the air compressor in fluid communication with the cavity, and, activating the air compressor.

In another preferred embodiment, the step of deforming comprises the step of deforming the liner to substantially follow the contours of the existing bathtub.

In yet another embodiment, the method further comprises the step of positioning a grate within the existing bathtub prior to positioning the liner.

In one embodiment, the method further comprises the step of cooling the liner after the step of deformation.

Preferably, the method further comprises the step of depressurizing the cavity.

In yet another embodiment, the method further comprises the steps of removing the formed liner, applying an adhering means to at least one of the existing bathtub and the liner, and, replacing the formed liner into position relative to the existing bathtub. Preferably, the method further comprises the step of caulking between the existing area of the bathtub and the liner.

In another embodiment, the method further comprises the steps of determining the desired positioning of at least one of an overflow opening and a drain on the liner after deformation, and, forming openings through the liner to correspond to the desired positioning of at least one of the overflow opening and drain.

BRIEF DESCRIPTION OF THE DRAWINGS

Reference is made to the accompanying drawings in which:

FIG. 1 of the drawings is a perspective view of the apparatus of the present invention;

FIG. 2 of the drawings is a perspective view of the existing bathtub;

FIG. 3 of the drawings is a perspective view of the liner prior to the formation thereof;

FIG. 4a of the drawings is a perspective view of the liner after partial formation has occurred;

FIG. 4b of the drawings is a perspective view of the liner after formation of the skirt portion;

FIG. 5 of the drawings is a cross-sectional view of the beginning of the formation process;

FIG. 6 of the drawings is a cross-sectional view of the formation process after deformation of the liner has begun;

FIG. 7 of the drawings is a cross-sectional view of the formation process nearing completion;

BEST MODE FOR PRACTICING THE INVENTION

Figure 8:
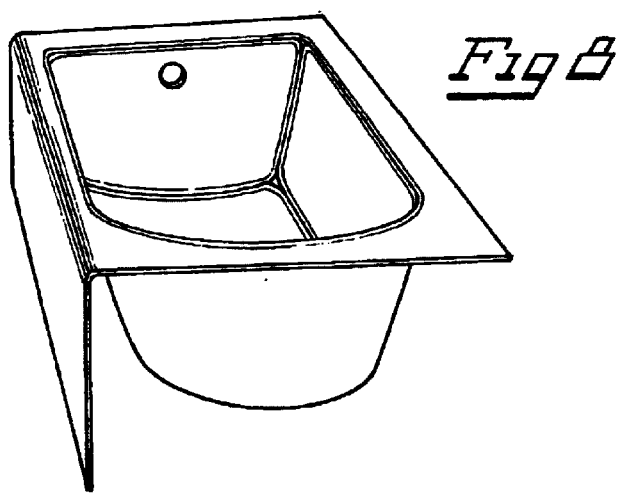
FIG. 8 of the drawings is a perspective view of the formed liner after removal from within the existing tub.

While this invention is susceptible of embodiment in many different forms, there is shown in the drawings and will be described in detail, one specific embodiment with the understanding that the present disclosure is to be considered as an exemplification of the principles of the invention and is not intended to limit the invention to the embodiment illustrated.

Referring now to the figures, and in particular to FIG. 1, bathtub liner forming apparatus is shown generally at 10. Most commonly, forming apparatus 10 is used in association with existing bathtub 100 (FIG. 2) to form liner 200 (FIG. 3) into the shape of the existing bathtub 100. Advantageously, while the liner can be formed with molds at the factory or other manufacturing facility, the forming apparatus is well suited for in place molding of a liner at the installation site, wherein the existing bathtub itself is used as the mold (without the removal of same).

Forming apparatus 10, as shown in FIG. 1, includes container 12, seal 14, heating element 16 (FIG. 5) and pressure supply means 18. Container 12 includes top surface 22, side walls 24, 25, 26 and 27, compensating member 29. The top surface and the side surfaces cooperate to define cavity 36. Of course other shapes for the container are likewise contemplated, such as a partially domed configuration wherein the top and the side walls are co-molded into a single component, a pyramid-like structure, or virtually any other shape which is capable of defining a cavity.

One or more of the top surface and the side walls may include a transparent member, such as transparent window 40 which permits an operator to view cavity 36 from the outside. In certain embodiments, a plurality of transparent windows may be utilized, or, the device may be substantially transparent providing a substantially unobstructed view of the full formation process and liner.

As shown in FIG. 1, side walls 24, 25, 26 and 27 cooperate with compensating member 29 which defines lower perimeter 38 (in embodiments which include the compensating members; it will be understood that the side walls alone will define the lower perimeter in embodiments which do not include any compensating members). It will be understood that bathtubs can vary in length from about 4 feet to about 6 feet. Moreover, even the standard 5 foot bathtub can vary a couple of inches due to the different surrounding tile and caulk. Similarly, the width of a tub will often vary between 30 and 36 inches, or even more. Furthermore, it is difficult to properly position the apparatus over the liner, where the fixtures remain in place.

Compensating member 29 compensates for these variations and permits the use of the apparatus without the dismantling of all of the plumbing fixtures. In particular compensating member comprises a rim which includes length compensating members 30, 30' and width compensating members 32, 32'. The compensating members each include top rail 81, bottom rail 82 and outwardly angled connector 83. As will be understood, the top rail of each respective compensating member is attached to the respective side wall and the bottom rail of each respective compensating member is positioned to rest on the surface of the liner to be formed. In certain embodiments, it is contemplated that a number of compensating members (i.e. a number of complete sets of length and width compensating members) can be provided in a kit each one having a different length and/or angle. Thus, the user at the site can determine which, if any compensating members are required for use such that the bottom rail is properly positioned upon the liner to facilitate deformation thereof, and each dimension tub can be accommodated by the apparatus. It is further contemplated that the compensating members may themselves be adjustable, by for example, making the top and bottom rails pivotally connected to the outwardly angled connector, and by providing adjustable mating regions at the interface of the length and width compensating members.

As the length and width compensating members are adjustable, the lower perimeter can be adjusted so as to correspond to the dimensions of the tub. Of course the length and width compensating means are not limited to any range, and as bathtub dimensions change, the range of adjustability for these members will likewise change.

Seal 14 is attached to the container and extends substantially around the entirety of lower perimeter 38. The seal comprises a material which can deform to follow the contours of the liner, which in turn substantially follows the contours of the upper rim of the existing bathtub so as to form a substantially fluid tight seal between the liner and lower perimeter 38. Among other materials, the seal may comprise a rubber, silicone, gel, cork or other material which is capable of forming a substantially fluid tight seal with the liner. In certain embodiments, it may be possible to utilize the lower perimeter itself as a seal without the application of seals made from other materials. In yet other embodiments, the seal may be molded together with the walls and the compensating members. In addition, the materials and the dimensions of the seal are selected so as to minimize any surface damage that the seal may impart onto the portion of the liner which it covers.

In certain embodiments, as shown in FIG. 1, weights, such as weights 55 may be positioned on top surface 22 so as to facilitate the integrity of seal 14 even when the pressure within cavity 36 is elevated. While various weights are contemplated for use, it is contemplated that weights 55 may comprise container 57 having inlet 58 and outlet 59. In such an embodiment, container 57 can be filled with a fluid (such as water) through inlet 58, and, after operation of the apparatus, the fluid can be emptied through outlet 59. Advantageously, container 57 can be transported empty to the site, and filled at the site with water from, for example, the sink in the bathroom. It can be drained into the sink after installation of the new bathtub. In this manner, the installer can minimize that which is necessary at the installation site.

Heating element 16 generally comprises at least one heating element which can increase the temperature within cavity 36 of container 12, and an area surrounding perimeter 38. In one embodiment, the heating element comprises an electric resistive heat, whereas in other embodiments, other heating elements may be used (hot air, heated circulating fluid, etc.). In certain embodiments, the heating element may be combined with the pressure supply means such that the air supplied by the pressure supply means is capable of being heated prior to insertion into the cavity. Generally, with the material utilized for liner 200, the heating element is generally required to elevate the temperature of the liner to about 270 to 300 F., so as to begin the deforming process. One suitable heating element is a quartz heater available from, for example, Grainger Supply corporation.

Referring now to FIG. 5, pressure supply means 18 (i.e. means for increasing pressure within the cavity) comprises connector 42, conduit 44 and air compressor 46. Connector 42 extends through the container (in the embodiment shown, though the top surface). Conduit 44 is connected at its first end to connector 42, and at its second end to air compressor 46. The connector 42 and conduit 44 place cavity 36 of container 12 in fluid communication with air compressor 46. Various air compressors are contemplated for use and a variety of air pressure ranges of operation are likewise contemplated. Generally, a pressure of about 100 psi is sufficient to begin the process of deformation of liner 200, provided that the heating elements have sufficiently elevated the temperature of liner 200.

To manufacture a bathtub liner using the above-identified apparatus, a user first measures various dimensions of the existing bathtub. This includes the length, width and height of the bathtub, as well as the length width and depth of the inner cavity of the bathtub. These measurements are then transferred to liner 200. Once the measurements are transferred, as shown in FIG. 4*a*, the corners of the liner are cut, and the edges are bent to form sides 202, 204 and 206. Again, while a mold bathtub may be utilized, wherein the mold is at a manufacturing site, a real advantage of the present system is that the bathtub liner can be formed on site without the removal of the existing bathtub, and, without virtually any preparation or machining on the existing bathtub.

Next, as shown in FIG. 4*b*, sides 202 and 206 are cut so that a portion of the liner can be bent (generally using a heated wire to melt the liner) to divide liner 200 into top panel 208 and front skirt 210. This, in turn, forms the skirt of the bathtub liner. While a straight cut is shown in FIG. 4*b*, it is contemplated that the skirt may include an embossing, surface variations, or may comprise a plurality of different intersecting planes. In other embodiments, the bathtub may be such that it does not include a front skirt. In such embodiments, the skirt is not formed into the liner.

As shown in FIG. 5, once the skirt is formed, liner 200 is positioned over existing tub 100 so that top panel 208 overlies the opening of the existing tub. In turn, front skirt 210 will overlie the front skirt of the existing bathtub. In certain embodiments, a grate such as grate 220 can be positioned on the bottom surface of the existing bathtub prior to placement of the formed liner. Of course, other elements (surface roughener, soap holder, handle member) can be positioned between the liner and the existing bathtub such that the liner will be molded around these objects into the desired orientation.

Prior to positioning of the apparatus, the proper compensating members 29 are selected and attached to the lower perimeter of the apparatus. Specifically, the measurements taken at the beginning will determine which compensating members (30, 30', 32, 32') are attached to the cavity so that the bottom surface of the bottom rail (which includes the seal) will be positioned in the desired location on the liner to be formed. Of course, in certain embodiments, it is contemplated that no compensating members may be needed. In embodiments that include adjustable compensating members, it is contemplated that the user will be able to provide the necessary adjustment.

Once the liner is positioned, apparatus 10 is placed upon top panel 208 so that cavity 36 opens directly onto top panel 208. Apparatus 10 is manipulated into position so that seal 14 is maintained in contact with liner 200, to in turn place cavity 36 is in a substantially fluid-tight arrangement with top panel 208. Of course, due to the surface variations, it is contemplated that there may be small leaks beyond seal member and that the seal will not be entirely fluid-tight. What is necessary is that a desired elevated pressure can be achieved within the cavity so as to achieve the proper formation.

Once the proper position of the apparatus is achieved, heating elements are activated to heat cavity 36, and, in turn, top panel 208 of liner 200. The heating elements continue to heat top panel 208 until a temperature sufficient to enable plastic deformation is achieved. For the type of material utilized to date, a temperature of 270–300 F. is generally sufficient to achieve plastic deformation of top panel 208.

Once a sufficiently elevated temperature is reached, air compressor 46 is activated which directs air through conduit 44 and coupling 42 into cavity 36. In certain embodiments, wherein apparatus 10 is not itself of sufficient weight to permit the cavity to reach a desired effective elevated pressure, additional weight 55 may be positioned over container 10 to insure that seal 14 maintains a substantially air tight configuration with respect to top panel 208. Of course, as explained above weight 55 may comprise a variety of different materials and configurations.

As shown in FIG. 6, as the compressed air (or other fluid to elevate the pressure within the cavity) is directed into cavity 36, top panel 208 will begin to plastically deform downward toward the existing bathtub. The deformation continues until, as shown in FIG. 7, top panel 208 substantially follows the contours and the shape of the inner cavity of the existing bathtub (as well as any other elements, such as a grate). In an embodiment wherein the container includes a window, a user can view the progress of the formation to determine when the liner is fully formed. In other embodiments without such a window, the time needed can be determined through experimentation and testing.

Once the liner is fully formed, the heating elements can be turned off either immediately or they may be ramped down at a predetermined rate (such that the proper temperature gradient is achieved). The air compressor continues to force air into cavity 36 to maintain the formed liner shape and to simultaneously cool the liner. Once the liner has been cooled to a temperature sufficient to insure that the deformed liner shape will be maintained, the air compressor can be turned off. Next, any weights, such as weight 55 are removed, and, finally, container 12 is removed from its position overlying top pane 208 and the existing bathtub. Once these structures have been removed, formed liner 200, which is now in the configuration shown in FIG. 8, can be removed (as can the grate positioned in the bottom of the existing tub).

To finalize the installation, openings are next cut into the formed liner for the overflow outlet, for the drain and for any other elements. In addition, the side walls and other irregularities are trimmed from the liner to insure a perfect fit within the existing walls. Next, a adhering means, such as an adhesive (i.e. byutal or two part), caulk, tape (i.e. double sided tape), or other material is applied to the liner and/or the existing tub to facilitate mating and adhesion of the lower surface of the liner and the existing tub. Once the binder is applied, the liner is repositioned within the existing tub, and pressure is applied to assist the binding process. In other embodiments, the adhering means may be applied prior to formation such that the formed liner is not removed from within the existing tub for further operations, rather, these operations occur with the liner in position within the existing tub. In such embodiments, a grate, if used, remains between the liner and the existing tub.

Figure 9:
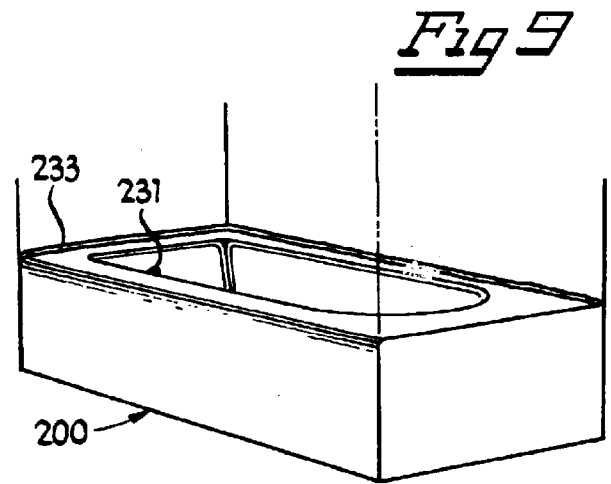
FIG. 9 of the drawings is a perspective view of the completed installation.
Figure 10:
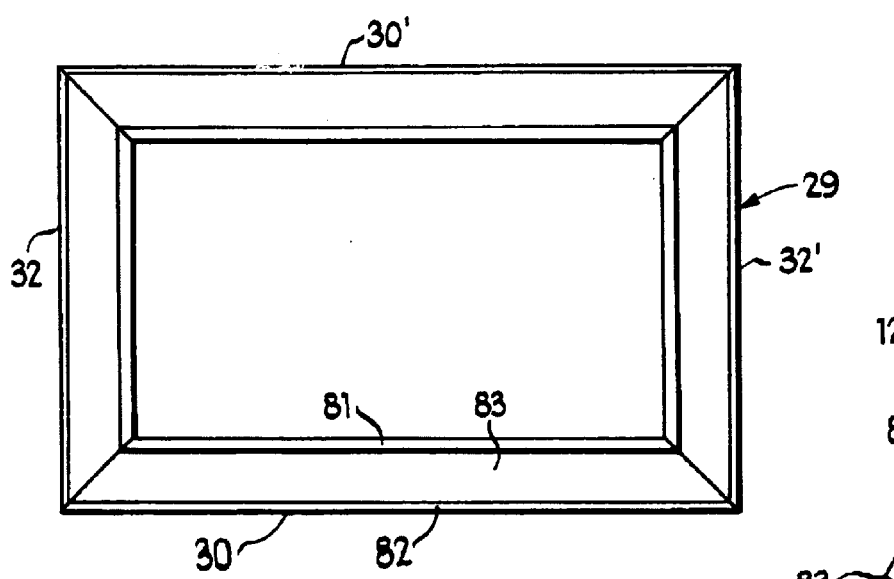
FIG. 10 of the drawings is a top plan view of the compensating member.
Figure 11:
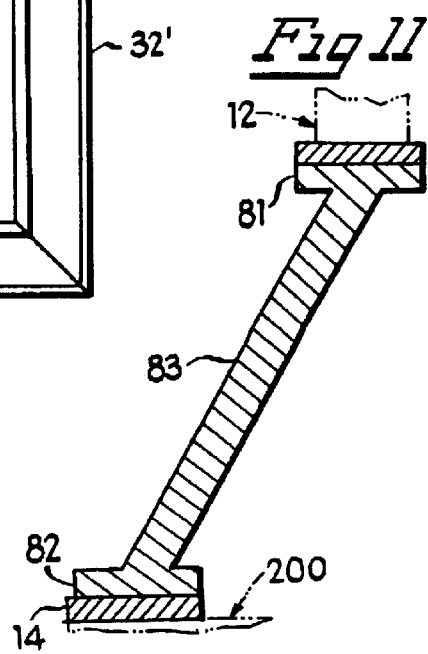
FIG. 11 of the drawings is cross-sectional view of the compensating member

As shown in FIG. 9, Once the final position is achieved and liner 200 is trimmed and fitted, overflow 231 and the drain are assembled (as well as any other custom elements). Lastly, in certain embodiments, a bead of caulk 233 is applied to the seams and connections between the liner and the existing walls. In addition, in other embodiments, the walls can be replaced or retiled.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. An apparatus for forming a bathtub liner over an existing bathtub comprising:

a container defining a cavity;

a seal associated with the cavity, the seal capable of forming a substantially continuous seal with a bathtub liner;

a heating element capable of heating the cavity;

means for increasing pressure within the cavity, to in turn, force a bathtub liner outwardly, away from the cavity, whereupon positioning of the liner and apparatus over a existing bathtub will force the liner toward an existing bathtub and;

a weight associated with the container, to, in turn, enhance the effectiveness of the seal member, wherein the weight comprises a second container having at least one of an inlet and an outlet, the second container being capable of storing a predetermined quantity of fluid therein.

2. The apparatus of claim 1 wherein the container further comprises:

a top surface; and a plurality of side walls associated with the top surface.

3. The apparatus of claim 1 wherein the container further comprises a compensating member.

4. The apparatus of claim 3 wherein the container further comprises a length compensating member and a width compensating member.

5. The apparatus of claim 3 wherein the compensating member comprises a kit which includes a plurality of compensating members.

6. The apparatus of claim 5 wherein the kit is capable of adapting the apparatus to correspond to an existing bathtub that is between four and six feet in length.

7. The apparatus of claim 1 wherein at least a portion of the container comprises a substantially transparent member.

8. The apparatus of claim 2 wherein the plurality side walls define a lower perimeter, the seal member extending about the perimeter defined by the plurality of side walls.

9. The apparatus of claim 1 wherein the heating element comprises a heater member positioned within the cavity.

10. The apparatus of claim 9 wherein the heating element comprises an electric heater being selectively activated.

11. The apparatus of claim 1 wherein the pressure increasing means comprises at least one air compressor in fluid communication with the cavity of the container.

* * * * *